United States Patent [19]
Thomsen et al.

[11] Patent Number: 4,471,808
[45] Date of Patent: Sep. 18, 1984

[54] HYDRAULIC CONTROL APPARATUS

[75] Inventors: Svend E. Thomsen, Nordborg; Erik Kyster, Augustenborg; Soren N. Sorensen, Nordborg, all of Denmark

[73] Assignee: Danfoss A/S, Nordborg, Denmark

[21] Appl. No.: 388,125

[22] Filed: Jun. 14, 1982

[30] Foreign Application Priority Data

Jul. 2, 1981 [DE] Fed. Rep. of Germany ....... 3126040

[51] Int. Cl.³ .................... F16K 47/04; F16K 11/02; F15B 13/04
[52] U.S. Cl. .................... 137/625.32; 137/625.3; 137/625.23; 251/205; 251/209; 91/467; 60/384
[58] Field of Search ............... 137/625.32, 625.3, 117, 137/625.23, 625.24; 251/209, 205; 91/467; 60/384

[56] References Cited

U.S. PATENT DOCUMENTS

| | | | |
|---|---|---|---|
| Re. 25,126 | 2/1962 | Charlson | 91/467 |
| 223,573 | 1/1880 | Ainsworth et al. | 137/625.32 X |
| 2,067,346 | 1/1937 | Rovinsky | 251/209 X |
| 3,591,136 | 7/1971 | Bishop | 137/625.3 X |
| 3,638,867 | 2/1972 | Venus, Jr. | 137/625.32 X |
| 4,262,689 | 4/1981 | Rodder | 251/209 X |
| 4,285,366 | 8/1981 | Elser | 137/625.32 X |

FOREIGN PATENT DOCUMENTS 516614 12/1939 United Kingdom ........... 137/625.23

Primary Examiner—Arnold Rosenthal
Attorney, Agent, or Firm—Wayne B. Easton

[57] ABSTRACT

The invention relates to a hydrostatic steering control unit of the type having valving for an open center neutral position which bypasses pressurized fluid from the pump to the tank when in neutral. During a turning operation with a steering wheel the open center valving is caused to close and the pressurized fluid is directed to one side or the other of a servomotor which is connected to wheels to be steered. The open center valving includes orifices in relatively rotatable elements which are aligned in the neutral position and closed to effect the turning operation. Open center valving can be the cause of noise and cavitation and such valving herein is provided with slot shaped orifices and flat generally wedge shaped throttle passages to minimize the noise and cavitation problems. The throttle passages are defined by curved bounding surfaces having rectangularly shaped outlines.

20 Claims, 9 Drawing Figures

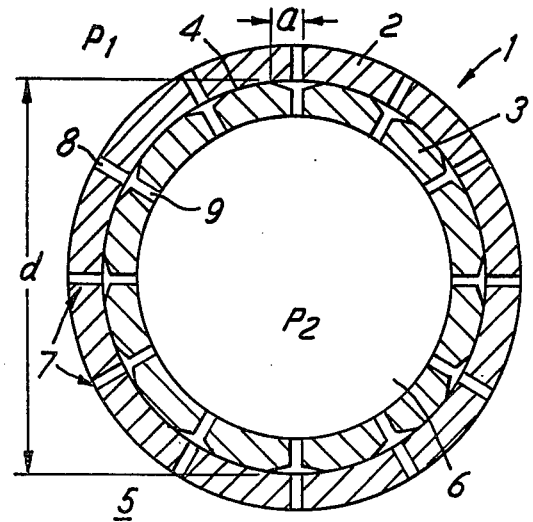
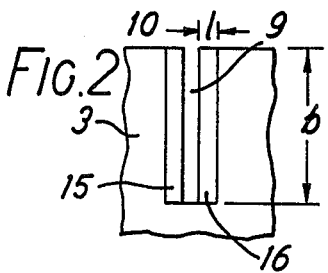
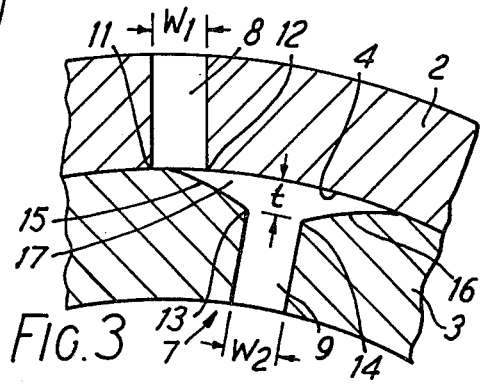
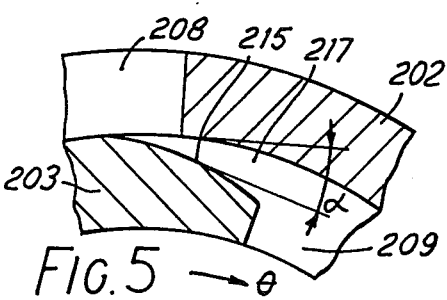
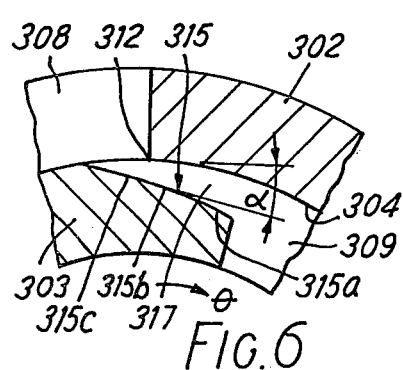
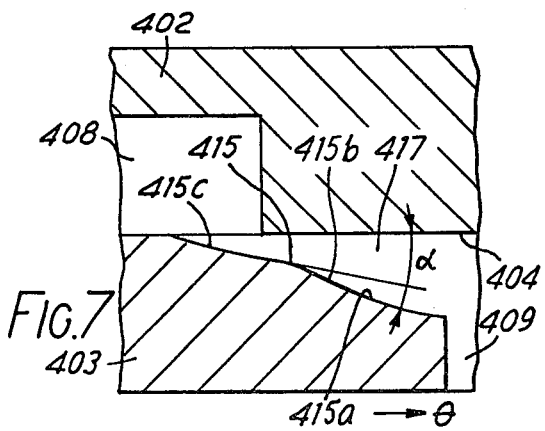

HYDRAULIC CONTROL APPARATUS

The invention relates to a hydraulic control apparatus with an adjustable throttle, in which two relatively rotatable rotary valve elements comprise respective first and second control orifices which are associated with a common sealing face, form parallel throttling points and are bounded at least on one side by an edge extending transversely to the direction of rotation.

In a known control apparatus of this kind (DE-OS No. 23 53 068), namely a steering device, two sleeve-shaped rotary valve elements provided in a housing bore can be turned relatively to each other through a limited angle out of a neutral position by means of a steering wheel against the force of return springs. The valve elements comprise control orifices which form a plurality of throttles. These include a neutral position throttle which is open in the neutral position to discharge pressure fluid from the pump direct to the container and closes after relative rotation through a predetermined angle, whilst throttles in the supply and return open simultaneously to lead pressure fluid through a metering motor to the servo-motor of the steering device and back from the latter to the container. The neutral position throttle consists of four throttle points of a first type and eight throttle points of a second type, all connected in parallel. The throttle points of the first type have control orifices bounded by edges extending in the axial direction. In the second type, the control orifices in the outer valve sleeve consist of larger bores and circumferentially offset smaller bores. The control orifice at the inner valve sleeve comprises a first axial groove section having the breadth of the larger bores and a second axial groove section having the breadth of the smaller bores. With the aid of the last-mentioned throttle points, it is intended to produce a flatter gradient for the characteristic curve of the pressure drop. It has, however, been found that considerable noise occurs in such a throttle at least when it is near the closed position. In some cases, cavitation phenomena were even observed.

The invention is based on the problem of providing a hydraulic control apparatus of the aforementioned kind in which considerable noise is avoided over the entire operating distance.

This problem is solved according to the invention in that a bounding surface adjoining the edge of the second control orifice over at least the greater part of its length has a spacing from the sealing face which decreases in the direction of rotation so that, upon relative rotation between the bounding surface and sealing face, a flat throttle passage is formed having a variable length and a large breadth relatively to its depth, and that at least the major part of the parallel throttle points is provided with such throttle passages.

In this construction, the fluid passes through the flat throttle passage as a comparatively thin film in contact with the sealing face and bounding surface over a large area. By reason of the friction at these surfaces and the friction between adjacent fluid layers in the film, the fluid as a whole is strongly braked. Comparatively short throttle passages will therefore suffice to bring about intensive throttling. This type of throttling will not lead to undesired increases in speed; there are therefore neither excessive noises nor cavitation phenomena. The presence of the throttle passages results in throttling curves which can be adapted to particular conditions by selecting the length and shape of the bounding surfaces, whereby control orifices in the form of multiple bores and the like can be dispensed with. To achieve the desired absence of noise and cavitation, the depth of the throttle passage must be very shallow. In order that the cross-section of the passage will nevertheless be sufficiently large, its breadth must be correspondingly large. By reason of the fact that at least the greater part of the parallel throttle points is provided with such throttle passages, no difficulties will arise, despite the limited space on a rotary valve, to make the sum of the breadths of all simultaneously effective throttle passages such that the desired shallow passage depth can be achieved.

Preferably, all parallel throttle points are provided with throttle passages in like manner, i.e. with throttle passages. It is particularly favourable if there is a shunt circuit of from 8 to 18 like throttle points. This leads to an exceptionally large value for the sum of the breadths of all simultaneously effective throttle passages, so that the cross-section of the passage will also be adequate for large throughputs.

If the control orifices are bounded by parallel edges at both sides, a bounding surface may adjoin each of both edges of the second control orifices. A throttle will then be obtained which is effective in both directions of rotation.

Preferably, the greatest depth of the throttle passage is a maximum of 0.2 mm and in particular less than 0.1 mm. If the edge forms an angle in cross-section, the greatest depth will be at the apex of this angle and, if the edge is rounded in cross-section, it will be measured at the end of the round facing the bounding surface.

The sum of the breadths of all throttle passages should be larger than the circumference of the largest circle on which a throttle passage moves during the relative rotation.

Advantageously, the largest length of the throttle passage corresponds to a central angle of between 4° and 15°. A large change in the throttling resistance will therefore already be achieved with comparatively little relative rotation. Comparatively small diameters will suffice for this purpose because a throttle passage with a maximum length of between 1.0 mm and 4.5 mm suffices for the desired results.

The width of the control orifices should correspond to a central angle of no more than 5° so that throttling will already be fully effective after a short relative rotation whereas the characteristic curve of throttling is flat in the vicinity of the zero point. This shape of characteristic curve permits the pressure drop and thus the energy losses to be kept as low as possible in a control apparatus with 'open centre', even if the actual neutral position during operation does not precisely coincide with the theoretically provided neutral position. Desirably, the width of the control orifices is about 0.6 mm to 1 mm.

When using sleeve-shaped rotary valve elements, it is advantageous to make all control orifices in the form of slots extending from the end. This permits comparatively narrow slots to be cut from the end.

When using sleeve-shaped rotary valve elements, the bounding surfaces should further be formed at the outer circumferential surface of the inner rotary valve element. Since this circumferential surface is concavely curved, tools for producing the bounding surfaces can be easily applied.

It is particularly advantageous if the bounding surfaces are ground. In this way one can remove comparatively little material, as is desirable for producing the flat throttle passage. However, there are also other possibilities, such as the chemical removal of material or spark errosion.

It is also favourable for the depth of the throttle passages to increase in the direction of pressure drop.

The variations in the depth of the throttle passage should be comparatively small. It is therefore advisable for the tangential angle between the tangents to the sealing face and bounding surface in extension of the edge of the first control orifice to be no more than 10°.

This can be achieved very simply if a planar bounding surface is applied to the outside of a sleeve-shaped inner rotary valve element. Such a planar surface can be produced by grinding over.

In many cases it is favourable for the tangential angle to increase towards the second control orifice at least over one section of the bounding surface. In particular, the bounding surface section of increasing tangential angle may be an exponential section of which the spacing from the sealing face lengthwise of the throttle passage substantially follows an e function. This leads to characteristic curves which are associated with different throughflow quantities and have substantially the same gradient at a predetermined pressure drop. This leads to a very stable control behaviour which is independent from the amount conveyed pump if the latter is, for example, driven by a vehicle engine.

In a preferred embodiment, a bounding surface section with increasing tangential angle is disposed between two bounding surface sections with decreasing tangential angle. The advantages achieved by this will be explained hereinafter.

The invention will now be described in more detail with reference to examples illustrated in the drawing, wherein:

FIG. 1 is a cross-section through a throttle of a control apparatus according to the invention formed by means of a rotary valve with sleeve-shaped rotary valve elements;

FIG. 2 is a partial plan view of an end section of the surface of the inner rotary valve sleeve;

FIG. 3 is an enlarged fragmentary section through the FIG. 1 rotary valve;

FIG. 4 is a diagrammatic representation of a throttle passage;

FIG. 5 is a diagrammatic representation of a modified throttle passage;

FIG. 6 is a diagrammatic representation of a further modified throttle passage;

FIG. 7 is a part-section through a rotary valve with plate-shaped valve elements;

Figure 8:
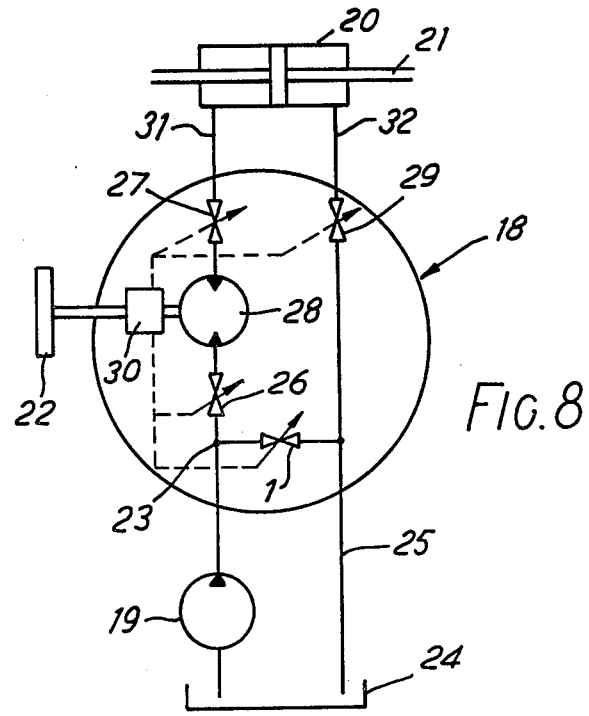
Figure 9:
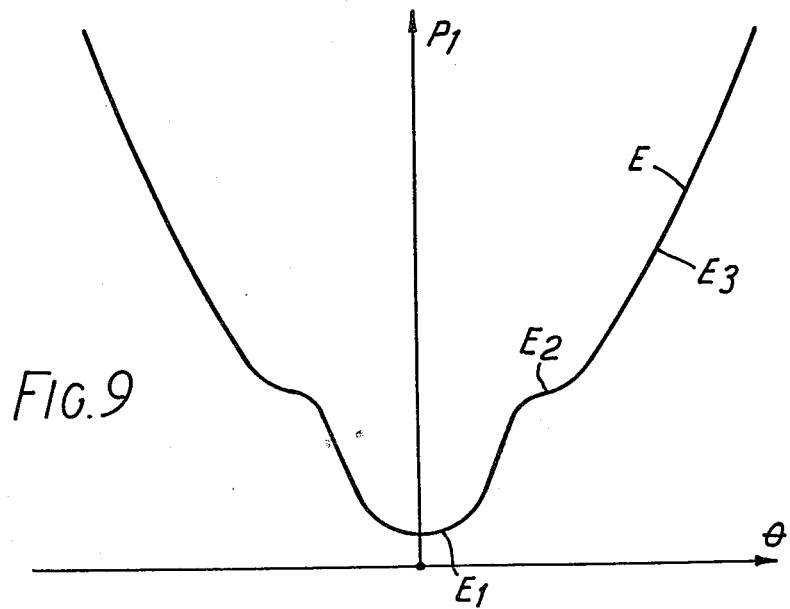

FIG. 8 diagrammatically illustrates the arrangement of the FIG. 1 throttle in a control apparatus, and FIG. 9 shows the characteristic curve of a throttle corresponding to the FIG. 6 throttle passage.

FIG. 1 shows an adjustable throttle 1 formed on a rotary valve comprising an outer rotary valve sleeve 2 and an inner rotary valve sleeve 3. Between the two there is a cylindrical sealing face 4. In the chamber 5 outside the rotary valve, it is assumed that the pressure is the pump pressure $P_1$. The pressure in the inner cavity 6 is the container pressure $P_2$. The construction of the rotary valve may be conventional in other respects, for example such as is shown in DE-OS No. 23 53 068.

The throttle 1 consists of a multiplicity of like throttle points 7 connected in parallel. Each of these throttle points 7 comprises a first control orifice 8 in the outer rotary valve sleeve 2 and a second control orifice 9 in the inner rotary valve sleeve 3. The control orifices are in the form of slots extending from the end 10 of the sleeves, as is shown for the control orifice 9 in FIG. 2.

Each control orifice 8 comprises two edges 11 and 12 and each control orifice 9 comprises two edges 13 and 14 as boundaries. All these edges are parallel. As is illustrated, the edges may be angular in cross-section but they can also be rounded. The edges 13 and 14 are adjoined by a respective bounding surface 15, 16 which, together with the sealing face 4, is adapted to define a throttle passage 17. The throttle passage 17 of each throttle point 7 has a maximum depth t which is very much exaggerated in the drawing, a maximum length l and a breadth b. The breadth b is large in comparison with the maximum depth t; it is at least 20 times the maximum depth t, mostly more than 50 times and very frequently 100 times or more. With n parallel like throttling points, the sum B of the breadths b of all throttle passages is effective, i.e. B=nb. The width $w_1$ of the cntrol orifice 8 and the width $w_2$ of the control orifice 9 are equal. Their breadth corresponds to the breadth b.

In one embodiment, the dimensions were as follows:
width $w_1$=0.6 mm
width $w_2$=0.6 mm
length l=1.5 mm
breadth b=10.0 mm
depth t=0.06 mm
throttle points n=12
diameter d of sealing face 4=32 mm .

From the above, the sum B of the breadths of all the throttle passages 17 is 120 mm, the circumference of the sealing face 4 is 100 mm and the operating distance a from the open neutral position to the closing position is 2.1 mm. It follows, that the sum B of the breadths is larger than the circumference of the sealing face 4.

In the following FIGS. 4 to 7, components corresponding to those of FIGS. 1 to 3 have reference numerals increased respectively by 100, 200, 300 and 400. Again, the sizes of the throttle passages is shown to an exaggerated scale.

FIG. 4 shows that the throttle passage 117 is bounded by a straight bounding surface 115. The valve element 102 has been turned out of the neutral position through an angle θ. With this rotation, the tangential angle α, which is measured in extension of the edge 112 of control orifice 108 between the tangent to the sealing face 104 and the tangent to the bounding surface 115, becomes gradually larger. It therefore decreases towards the control orifice 109.

In the FIG. 5 embodiment, a bounding surface 215 is provided for the throttle passage 217, wherein the tangential angle α increases towards the control orifice 209.

FIG. 6 shows an embodiment in which the bounding surface 329 consists of two rectilinear sections 315a and 315c and a connecting section 315b. In the sections 315a and 315c, the tangential angle α therefore decreases towards the control orifice 309. The tangential angle α increases in the connecting section 315b; it has the shape of an exponential section of which the spacing from the sealing face 304 in the longitudinal direction of the throttle passage 317 substantially follows an e function.

In the FIG. 7 embodiment there are no sleeve-shaped valve elements. Instead, the rotary valve is in the form of two plate-shaped valve elements 402 and 403. The control orifices 408 and 409 extend radially. The sealing face 404 is disposed in a plane. The bounding surface 415 for the throttle passage 417 again consists of three sections, the middle connecting section 415b having a tangential angle α which increases towards the control orifice 409 whereas the two end sections 415a and 415c have a decreasing tangential angle α.

FIG. 8 shows a control apparatus 18 of a steering device for motor vehicles, the apparatus being for example fed by a compression pump 19 and, in dependence on the rotation of a hand wheel 22, serving to control a servo-motor 20 of which the piston rod 21 is connected to the wheels to be steered. The control apparatus 18 comprises the adjustable throttle 1 which can connect the pump connection 23 directly to a conduit 25 leading back to the container 24, two series-connected supply throttles 26 and 27 between which there is a metering motor 28, and a return throttle 29. The throttles 1, 26, 27 and 29 are together actuated by a setting device 30 which is adjusted in dependence on the steering wheel 22 and the metering motor 28. The circuit is illustrated for one operating direction of the servo-motor 20. In the opposite operating direction, the operating conduits 31 and 32 leading to the servo-motor 20 and their associated throttles are exchanged by reversing means within the control apparatus 18. In the neutral position, the adjustable throttle 1 is fully open so that the pressure side of the pump is connected directly to the container 24; the supply throttles 26 and 27 as well as the return throttle 29 are closed. Upon displacement from the neutral position, the adjustable throttle 1 closes gradually whereas the supply throttles 26 and 27 open. The return throttle 29 opens somewhat later.

FIG. 9 shows the characteristic throttle curve for the FIG. 6 embodiment. Similar considerations apply to FIG. 7. For a predetermined throughput, the pressure $P_1$ is plotted against the relative angle $\theta$ of rotation. Characteristic curves for other throughputs follow a similar course. In the neutral position, the characteristic curve E has a flat section $E_1$ produced in that the control orifices 308 and 309 are to a large extent in registry not only in the neutral position but also to both sides thereof and therefore the amount of throttling is small. For setting the pressure $P_1$, therefore, it is harmless if the rest position of the control apparatus is slightly beyond the precise neutral position. If the bounding surface overlaps the edge 312, the effective cross-sectional area of the throttle passage 317 initially changes little with the angle of rotation. For this reason, the characteristic curve exhibits a flat $E_2$. This is so disposed that, in a control apparatus where the supply throttle 26, 27 opens at a smaller angle than the return throttle 29, a slight inaccuracy in the instant of opening of the return throttle 29 will not have a detrimental influence on the pressure conditions. Finally, the section $E_3$ of the characteristic curve serves for the actual pressure control step. By employing an exponential surface section 315b, this section $E_3$ receives a smaller gradient. In addition, characteristic curves for different throughputs have approximately the same gradient for the same pressure $P_1$. This results in a high stability during regulation.

We claim:

1. A hydraulic steering control apparatus with adjustable throttle means, comprising, first and second relatively rotatable inner and outer valve elements having engaging cylindrically shaped sealing surfaces, sets of first and second cooperable slot shaped control orifices respectively in said first and second elements with the axially extending breath of each said orifices extending normal to the direction of movement between said elements, said first and second sets of orifices being open and radially aligned in a neutral position and presenting varying throttling resistance during relative rotatable movement of said elements to a closed position, a first orifice of said first set having leading and trailing edges in said surface of said first element, a second orifice of said second set cooperable with said first orifice and having a throttle passage mouth with parallel first and second edges extending transversely relative to said direction of movement between said elements and forming a bounding surface of said mouth which defines a throttling passage with said surface of said first element, said first edge forming a recessed orifice edge spaced a distance t from said surface of said first element and said second edge being in said surface of said second element and spaced from said first edge in a trailing direction relative to said direction of movement, said distance t being substantially smaller than said breath of said orifices.

2. A control apparatus according to claim 1 wherein all of said orifices of said sets of orifices are provided with throttle passages in a like manner.

3. A control apparatus according to claim 2 having 8 to 18 of said sets of orifices connected in parallel.

4. A control apparatus according to claim 1 wherein said second control orifices are defined on both circumferential sides thereof by parallel edges adjoined by bounding surfaces which are mirror images of said bounding surfaces.

5. A control apparatus according to claim 1 wherein the maximum distance t is on the order of 0.2 mm.

6. A control apparatus according to claim 1 wherein the minimum distance t is on the order of 0.1 mm.

7. A control apparatus according to claim 1 wherein the sum of said axially extending breaths of all of said orifices is larger than the circumference of said engaging sealing surfaces.

8. Control apparatus according to claim 1 wherein the circumferential length of said bounding surface subtends an angle between 4 and 15 degrees.

9. Control apparatus according to claim 1 wherein the largest circumferential length of said bounding surface is between 1.0 and 4.5 mm.

10. Apparatus according to claim 1 wherein the width of each said control orifice corresponds to a subtended angle no greater than about 5 degrees.

11. A control apparatus according to claim 1 wherein the width of said control orifices is about 0.6 mm to 1 mm.

12. A control apparatus according to claim 1 wherein all of said control orifices are in the form of slots extending from one end of said valve elements.

13. A control apparatus according to claim 1 with sleeve-shaped rotary valve elements, said bounding surfaces being formed at the outer circumferential surface of said inner valve element.

14. A control apparatus according to claim 1 wherein each said bounding surface is ground.

15. A control apparatus according to claim 1 wherein the depth of said throttle passage increases in the direction of pressure drop.

16. A control apparatus according to claim 1 wherein a tangential angle (α) measured between the tangent through a trailing edge of an orifice in said first set of orifices and the tangent through the boundary surface of a corresponding orifice in said second set is no more than about 10 degrees.

17. A control apparatus according to claim 13 wherein said bounding surface is a planar surface.

18. A control apparatus according to claim 16 wherein said tangential angle (a) increases towards said second control orifice at least over a section of said bounding surface.

19. A control apparatus according to claim 18 wherein said bounding surface section of increasing tangential angle is an exponential section of which the spacing from said sealing face lengthwise of said throttle passage substantially follows an e function.

20. A control apparatus according to claim 19 wherein said surface section of increasing tangential angle ($\alpha$) is provided between two bounding surface sections of decreasing tangential angle.

* * * * *